US010744827B2

(12) United States Patent
Fu et al.

(10) Patent No.: US 10,744,827 B2
(45) Date of Patent: Aug. 18, 2020

(54) TIRE PRESSURE MONITORING SYSTEMS AND METHODS

(71) Applicant: Jianzhong Fu, Rockville, MD (US)

(72) Inventors: Liming Fu, Rockville, MD (US); Jianzhong Fu, Rockville, MD (US)

(73) Assignee: Jianzhong Fu, Rockville, MD (US)

( * ) Notice: Subject to any disclaimer, the term of this patent is extended or adjusted under 35 U.S.C. 154(b) by 0 days.

(21) Appl. No.: 16/258,665

(22) Filed: Jan. 27, 2019

(65) Prior Publication Data

US 2019/0152276 A1 May 23, 2019

Related U.S. Application Data

(63) Continuation of application No. 14/536,187, filed on Nov. 7, 2014, now Pat. No. 10,189,319, which is a continuation of application No. PCT/CN2013/087531, filed on Nov. 20, 2013.

(51) Int. Cl.
*B60C 23/02* (2006.01)
*B60C 23/04* (2006.01)
*B60C 23/06* (2006.01)

(52) U.S. Cl.
CPC .......... *B60C 23/02* (2013.01); *B60C 23/0474* (2013.01); *B60C 23/0488* (2013.01); *B60C 23/061* (2013.01)

(58) Field of Classification Search
CPC . B60C 23/02; B60C 23/0474; B60C 23/0488; B60C 23/061
See application file for complete search history.

(56) References Cited

U.S. PATENT DOCUMENTS

2007/0090933 A1* 4/2007 Nakao ................... B60C 23/061
340/443
2011/0029214 A1* 2/2011 Fu ......................... B60C 23/061
701/75

* cited by examiner

*Primary Examiner* — Thomas S McCormack
(74) *Attorney, Agent, or Firm* — Syncoda LLC; Feng Ma (57) ABSTRACT

An indirect tire pressure monitoring (WSB TPMS) method includes establishing a wheel speed reference value database using a vehicle speed, and correcting the real-time wheel speed through tire wear compensation, and then based on a comparative analysis of the real-time wheel speed and the wheel speed reference value, determining the degree of tire deflection deformation and tire safety, and to give an alert message prompt based on the tire pressure abnormality information.

19 Claims, 3 Drawing Sheets large area & uneven pressure     large area & uniform pressure small area & uneven pressure

TIRE PRESSURE MONITORING SYSTEMS AND METHODS

CROSS-REFERENCE TO RELATED APPLICATIONS

The present application is a continuation of, and claims priority to, U.S. patent application Ser. No. 14/536,187 filed on Nov. 7, 2014 (now U.S. Pat. No. 10,189,319), which is a continuation of, and claims priority to, PCT/CN2013/087531 filed on Nov. 20, 2013, which claims priority to Chinese Patent Application No. CN 201210492762.9 filed on Nov. 20, 2012. The disclosures of these applications are hereby incorporated by reference in their entirety.

BACKGROUND

A Tire Pressure Monitoring System, or TPMS, can perform real-time monitoring of a tire pressure, and provide warning for a low tire pressure or an overly high tire pressure. TPMS include direct TPMS and indirect TPMS. In indirect TPMS, tire speed changes are monitored through monitoring tire deformations (wheel rotating diameter). Then tire deformations are described by tire pressure variations. In direct TPMS, pressure sensors monitor tire pressures directly. Tire deformations are kept under their limits through tire pressures controls. The ultimate goal for direct TPMS and indirect TPMS is to monitor tire deformations and keep them under limits. Tire pressure is an intermediate variable that describes tire deformation. Based on the current TPMS standards (FMVSS 133, GB/T 26149 and et. al.), TPMS should provide the real-time tire pressure and warning by means of sound or light when real-time tire pressure is below 75% of cold tire pressure or above 125% of it.

SUMMARY

The present disclosure relates in general to automobile driving safety, and more specifically to an improved method for indirect tire pressure monitoring system (WSB TPMS) technology.

In an aspect, a tire safety monitoring method is provided, including obtaining a satellite-based vehicle speed; deriving a standard wheel speed based on the vehicle speed; obtaining a real-time actual wheel speed; determining a tire deformation based on the standard wheel speed and the real-time actual wheel speed; and providing an indication based on the determined tire deformation.

In some embodiments, the obtaining a satellite-based vehicle speed includes obtaining the vehicle speed from at least one of a satellite-based system, such as the global positioning system (GPS), or a wireless communication system, such as the 5 G system.

In some embodiments, the deriving a standard wheel speed based on the vehicle speed comprises at least one of looking up a standard wheel reference speed database, or employing a mathematical relationship between the vehicle speed and the standard wheel speed.

In some embodiments, the deriving a standard wheel speed based on the vehicle speed comprises employing a mathematical relationship between the vehicle speed and the standard wheel speed.

In order to eliminate the existing WSB TPMS technical defects, various embodiments of the present disclosure provide an improved method of WSB TPMS technology.

In some embodiments, using the speed measurement data of the Vehicle position-based speed measurement data independent of the vehicle's tachometer (including GPS, Beidou, RF speed RFID, video speed, etc.) of as the TPMS vehicle speed, establish the GPS vehicle speed based standard wheel's reference wheel speed database and/or the vehicle speed/wheel speed mathematical analysis relationship model or the expression $Vg=\omega R=n2\pi R=nz\alpha R$, $Vg$ is the GPS speed, $\omega$ is the wheel angular speed, n is the number of wheel revolutions, z is the number of teeth of the wheel speed sensor, $\alpha$ is the angle between two teeth (corresponding to two electrical signals), and R is the rolling radius of the wheel. In some embodiments, according to the relationship between tire service life and wear, the tire wear amount and the real-time rolling radius of the wheel are calculated by using the tire running mileage data, and the ratio of the real-time rolling radius of the worn wheel to the standard wheel rolling radius is calculated, and the real-time wheel speed of the worn tire wheel is corrected to the real-time wheel speed of standard wheel.

In some embodiments, based on the relationship between tire service life and wear, the tire wear amount and the ratio $Rr/R$ of the real-time vehicle rolling radius to the standard wheel rolling radius are calculated as the real-time wheel speed $\omega rc$ correction coefficient, compensate for wheel speed distortion caused by tire wear.

In some embodiments, through comparing the real-time wheel speed data $\omega rc$ with the corresponding wheel speed reference value $\omega br$ of the standard wheel speed database, or analyzing and calculating according to the mathematical analysis relationship model of the vehicle speed/wheel speed/tire deformation/tire pressure, to determine the tire deformation abnormality and alarm as abnormal tire pressure information.

The standard wheel consists of the specified model size rim+brand new tire. Standard wheel speed reference database from standard wheel under half load tire pressure and half load capacity (or under load/pressure gauge conditions) and 75% half load tire pressure to 125% half load tire pressure range.

The tire running mileage data is accumulated mileage data of the vehicle GPS and/or the accumulated mileage data of the vehicle speedometer (odometer).

Various embodiments of the present disclosure also provide a computer implemented vehicle tire safety monitoring method that determines a real time wheel speed alarm threshold $\omega t$ or reference value $\omega br$ based on real time vehicle speed $Vg$ dynamics.

The wheel speed alarm threshold $\omega t$ data acquisition method is to use the wheel rolling radius corresponding to the specified tire sink deflection threshold (load/pressure gauge or the tire cold inflation pressure label indicated 75% tire pressure value), according to the linear velocity angular velocity of the rotating body The function $(V/\omega=R)$ calculates the wheel speed data corresponding to the range of the vehicle speed $Vg=Vmin$ to $Vmax$ in order with the vehicle speed $Vg$ as a variable, and the wheel speed data group constitutes a wheel speed alarm (tire sinking deformation) threshold database.

The wheel speed alarm threshold data further includes a tire protrusion deformation alarm threshold, that is, a wheel rolling radius corresponding to a specified tire protrusion deformation threshold (a load/pressure gauge or a tire cold inflation pressure label indicating 125% tire pressure value), according to the rotating body The linear velocity angular velocity function $(V/\omega=R)$, in which the vehicle speed $Vg$ is used as a variable, sequentially calculates wheel speed data corresponding to the range of the vehicle speed $Vg=Vmin$ to Vmax, and the wheel speed data group constitutes a wheel speed alarm (tire bulge deformation) Threshold database.

Various embodiments of the present disclosure also provide a non-transitory computer readable medium having stored thereon instructions for vehicle tire safety monitoring, the instructions including determining a real time wheel speed alarm threshold based on a real time vehicle speed of the vehicle, and determining the tire safety status based on the comparison of the real time wheel speed and the wheel speed reference values. The non-transitory computer readable medium includes at least one of the direct determination or the indirect determination, wherein the direct determination comprises determining the dynamic correlation between the vehicle motion speed and the real time wheel speed alarm threshold, through at least one of a database lookup or a mathematical relationship, and wherein the indirect determination includes: calculating a real-time wheel speed warning threshold based on the mathematical model, including: $Vg=\omega R=n2\pi R=nz\alpha R$ where Vg is the vehicle Speed, $\omega$ is the angular velocity of the tire, n is the number of revolutions of the tire, z is the number of teeth of the wheel speed sensor, $\alpha$ is the angle between the two teeth of the wheel speed sensor, R is the radius of the tire, and the processor is configured to calculate the real-time wheel speed alarm threshold $\omega y$ based on real-time vehicle motion speed.

The driving force and braking force of a vehicle depend on the adhesion between the tire and the road surface, and the adhesion is determined by the product of the positive pressure of the tire on the road surface and the ground contact area and the friction coefficient. For a specific tire, within the range of permitted tire load, the uniform distribution of the positive pressure between the tread and the ground contact area of the tire is an ideal state pursued by the vehicle design engineer, the uniform distribution of the positive pressure on the ground contact area is also the ideal state of deflection deformation of the tire under load Or expected by the Load/Pressure Table conditions.

The tire manufacturer gives the load/pressure gauge and the vehicle manufacturer uses the tire cold inflation pressure label to indicate the tire cold inflation pressure data under different load conditions. For example, the tire cold inflation pressure label of the Audi Q7 passenger car indicates the tire cold inflation pressure data under half-load condition (3 persons/240 Kpa) and full load condition (5 person/340 Kpa), labeling the tire cold inflation pressure is a technical measure to achieve the tire deflection deformation or the ground contact area positive pressure uniform distribution in ideal state or close to ideal state.

The flexural deformation of the load bearing tire (the wheel rolling radius R is reduced) is proportional to the load W and inversely proportional to the tire pressure P. The mathematical expression: $W/P=S$ derives the relation $W/P=R$. When W/P is proportionally changed, R is a fixed value. This is an example in the tire product of technical common sense, that is, the yield of the object (plasticity). The deformation is a fixed value. In layman's terms, the deflection threshold of the tire is fixed, it is determined only by the specifications and materials of the tire, and does not follow changes in tire pressure, load and temperature.

The current TPMS technical standards (such as FMVSS 138; GB/T 26149, etc.) stipulate that when the real-time tire pressure $\leq 75\%$ of the tire cold inflation pressure or $\geq 125\%$ of the tire cold inflation pressure, TPMS will display and give abnormal tire pressure alarm in sound and light. The information is essentially to calibrate the tire cold inflation pressure as the tire pressure reference value (tire pressure reference), and to specify that the tire sinking deflection deformation threshold corresponds to the 75% tire pressure reference value, that is, the lower limit of the wheel rolling radius threshold, the minimum tire (convex) ground contact area corresponds to the 125% tire pressure reference value, that is, the upper limit of the rolling radius of the wheel, thereby confirming that under the TPMS standard the tire cold inflation pressure corresponds to the tire deflection deformation reference value or the wheel speed reference value.

The wheel rolling radius R based on the tire deflection threshold is a common technical knowledge. The R value variation is proportional to the tire deflection and grounding area. The tire grounding area S is also a fixed value, derived from the $W/P=S$ expression. The correlation expression $W/P=R$. It can be seen that the tire cold inflation pressure data under the specified load condition (W/P) in the current TPMS technical standard basically defines the tire deflection deformation reference value or the wheel rolling radius as a fixed value, and then from $V/\omega=R$ it can be inferred that the tire deflection deformation reference value corresponds to different vehicle speed/wheel speed data combinations.

The prior art WSB TPMS technical solution takes the wheel speed as a monitoring variable, compares the real-time wheel speed data with the wheel speed reference value, and then converts the wheel speed data into tire pressure data and alarms with tire pressure abnormality information. The wheel speed reference value of the prior art WSB TPMS technical solution adopts a random calibration method, which assumes that the initial parameters of the vehicle operation (tire pressure, load and temperature, etc.) are normal values, and through sampling and calculation of the wheel speed data of each wheel by WSB TPMS in limited time (hundreds seconds), the real-time wheel speed reference value is obtained, the wheel speed reference value is not constant, and varies with tire pressure, temperature and load.

For example, the Audi Q7 passenger car is inflated with a half load (3 persons) half load tire pressure of 240 Kpa. After the wheel speed data sampling and calculation, the real-time wheel speed reference value $\omega1$ is obtained. If the load is changed to 5 persons load condition and the tire pressure is maintained at half load tire pressure 240 Kpa, the reference value of the real-time wheel speed becomes $\omega2$, and $\omega2 \neq \omega1$. Because the load fluctuation causes the wheel rolling radius to change, the wheel speed $\omega$ must change. Therefore, the WSB TPMS's real-time wheel speed reference value is not fixed, the comparison between the real-time wheel speed data and the real-time wheel speed reference value is only the data comparison. The tire deflection deformation cannot be correctly described. The final tire pressure abnormality information cannot correctly describe if the tire pressure is normal or not, this is confirming the WSB TPMS technical solution has design flaws.

The wheel speed reference value of the existing WSB TPMS technical solution is calibrated according to the initial conditions of the system, and the wheel speed reference value is not fixed, which can be called the relative wheel speed reference value; the wheel speed reference value corresponding to the TPMS technical standard or load/pressure gauge and the tire deflection deformation characteristic is only determined by the physical parameters of the tire. It is a fixed value that does not change due to factors such as tire pressure, load and temperature. It can be called the absolute wheel speed reference value.

Existing WSB TPMS approaches employ the relative wheel reference value, which depends on the real-time vehicle wheel speed data acquisition and calculation, which is difficult to meet the real-time monitoring requirements, and it is impossible to implement monitoring of all the wheels (e.g., four) of the vehicle. These approaches were previously referred to as inferior technology (see, e.g., NHTSA S49 CFR Parts 571 and 585-page 40 in the FMVSS 138 standard specification document).

Various embodiments of the present disclosure are based on the research of the bearing deformation of the tire and the insufficiency of the implicit inflation caused by the change of the tire load, and reveals the causes and harms of the defects of the existing WSB TPMS technology.

In addition, by introducing the vehicle position-based digital data Vg independent of the vehicle speedometer speed as the TPMS vehicle speed value, the vehicle speed error caused by the vehicle speed measuring device is avoided.

Further, various technical methods of some embodiments of the present invention establish a standard wheel speed reference database (absolute wheel speed reference database) based on the technical principle of the tire deformation threshold, and compare the real-time wheel speed with the standard wheel speed reference value. Determining the safe state of the tires allows for immediate (no hysteresis) monitoring of wheel speeds on all of the vehicle's wheels, overcoming the technical deficiencies of existing WSB TPMS and enabling real-time wheel speed data to accurately describe tire deflection. Devices according to some embodiments of the present disclosure may issue information on abnormal tire pressures, such as when tire deformation must meet or exceed a deformation threshold. Otherwise, the tire deflection is within the allowable range, which overcomes the technical deficiencies of the existing WSB TPMS technology.

Various embodiments the disclosure do not need to monitor the tire load and temperature and convert the wheel speed data into the tire pressure data. By comparing the real-time wheel speed and the reference wheel speed value, it can determine the tire deformation or the tire pressure abnormality or the tire safety state, which is a substantial innovation compared with the WSB TPMS technologies.

DETAILED DESCRIPTION

An objective of designing TPMS is to inform people to adjust tire pressures by providing tire pressure abnormal warning, so that crashes related to tire failure could be avoid. According to the technical report on TPMS effectiveness evaluation by NHTSA in November 2012, the presence of TPMS on a vehicle is estimated to result in a 55.6 percent reduction in the likelihood that the vehicle will have one or more severely underinflated tires (25% or more below the vehicle manufacturer's recommended cold tire pressure). However, it is difficult to evaluate the reduction of tire failure and crashes. That is to say, TPMS is not effective at preventing tire failures and crashes, the reason is that the tire pressure abnormality information provided by the existing TPMS is only the abnormality of the tire pressure data or the deviation from the tire pressure reference value, and the tire pressure abnormality information has no corresponding relationship with the tire deflection deformation threshold or the reference value.

Tire property shows that tire pressures are proportional to tire loads which are proportional to tire deformations when tire loads do not exceed placard loads. The most direct and convenient method to keep tire deformations within limits is to monitor and adjust tire pressures. Because of "load reserve" properties of tires, tire loads could not exceed maxi load nor below vehicle mass. The tire deformations would stay within limits if tires have been inflated properly based on the load.

Therefore, it may be needed to indicate tire pressures under both half-loaded condition (<3 occupants) and loaded condition (4-7 occupants). Take Audi Q7 for an example, the front tire pressure is 240 KPa under half-loaded condition and 300 Kpa under loaded condition. The rear tire pressure is 240 KPa under half-loaded condition and 340 Kpa under loaded condition.

Existing direct (PSB) TPMS analyzes real-time tire pressure and determines it based on cold tire pressure under semi-load conditions. This does not comply with the Load/Pressure Table and the Tire Technical Standard (GB/2978). The PSB TPMS has clear and unambiguous technical deficiencies because it fails when the load changes. With the popularity of TPMS, more and more passenger car manufacturers only provide half-load cold tire inflation pressure label, FMVSS 138 standard stipulates tire pressure reference value does not consider load change, FMVSS 110 standard stipulates passenger car tire cold inflation pressure. The label is a single value, proving that there is a technical bias in the passenger car field, resulting in the existing PSB TPMS becoming a defective product.

Chinese Patent Application No. 201010592003.0 discloses a method for distinguishing freight vehicle tire pressure abnormality. In this application, a database is proposed to help remediating the flaws of the current TPMS. This database could include parameters like tire models, relations between load and tire initial pressures, real-time tire pressures, load, speed, temperatures and so on. The tire pressure at 18 degree Celsius could be calculated from real-time tire pressure according to a function of tire pressure, load, temperature and speed. Then the tire pressure at 18 degree Celsius is compared with the tire initial pressures in the database before TPMS provide an accurate warning.

The technical solutions disclosed by Chinese Patent Application No. 201010592003.0 are indicated for use by freight vehicles. A lot of parameters are used in this patent. It could increase the accuracy of warnings for abnormal pressures at the expense of restricted working conditions for tires. The drivers could feel overwhelming by frequent warnings and accurate date. As such, these approaches may not be practical in transportations.

Tire properties are technical knowledge. Inflating tires properly according to load is technical knowledge that has been regulated by national standard. Technically, monitoring load and determination of dynamic tire pressure benchmark are not difficult. The passenger car manufacturers overestimate functions of tire load reserve; ignore researches on hazard caused by over deformation of tires due to load variations; or take it for granted that drivers would resist inflating tires properly according to load. They have technical bias and take only one tire pressure as benchmark. This bias misleads users from taking dynamic tire pressures based on load as benchmarks. One of the evidences for the bias is that only one tire pressure is in the passenger car tire pressure label, while in the past tire pressures under both half-loaded and loaded conditions were there.

Embodiments of the present invention provide a vehicle tire safety monitoring system. The system can include a processor, wherein the processor is configured to determine a real-time tire safety baseline based on real-time conditions of the vehicle.

In some embodiments, the real-time tire safety baseline comprises a tire pressure baseline, and wherein the processor is configured to determine a dynamic correlation between the tire pressure baseline and a tire load by at least one of a database lookup or a mathematical relationship.

Embodiments disclosed herein may address some of the deficiencies in current PSB TPMS. In particular, the dynamic tire pressure tire pressure reference (pressure baseline) is provided to improve the tire pressure monitoring effect so that the real-time tire pressure can correctly describe the tire deflection.

Constructing a database of tire pressure standards and/or mathematical relations between loads and tire pressures: tire pressure standards are cold tire pressures (that correspond to load) when vehicle is properly loaded. All tire pressure standards are included in the database. The tire pressure is a function of load depending on vehicle model and tire type.

Current tire pressure standards are cold tire pressures that correspond to current loads. TPMS ECU can call corresponding tire pressure standard from the database after current load is known. So that the dynamic correlations between tire pressure standards and loads are realized. The tire pressure standard can be adjusted based on the mathematical relations between loads and tire pressures.

Real-time load data are collected by load sensors mounted on bearing parts of each wheel, and/or collected directly or indirectly by other types of sensors mounted on other parts of the vehicle. Data collecting methods include continuous collecting and/or pulse collecting of static and/or dynamic load data.

Load sensors include and are not limited to pressure sensors, displacement sensors, chair sensors, infrared sensors, and ultrasound sensors.

The real-time tire load data are transmitted to TPMS ECU via wire transmission and/or wireless transmission. The current mainstream way for WSB TPMS to monitor wheel speed is to monitor wheel speed data via an ABS wheel speed sensor (magnetoelectric) and the wheel speed data signal is transmitted through the vehicle harness to the TPMS Data Processing Center (ECU).

The TPMS can provide driver information such as tire pressure standard and real-time tire pressure simultaneously by sounding and/or screen display. For example, real-time tire pressure, current tire pressure standard and its boundaries (±25%) can be provided by at least one of an audio signal, a visual signal on a screen or with a light indicator, or a heptic indication.

Embodiments disclosed herein may cure some deficiencies in the current WSB TPMS.

The current mainstream approach for WSB TPMS monitoring wheel speed is to monitor wheel speed data via ABS wheel speed sensor (magnetoelectric) and the wheel speed data signal is transmitted through the vehicle harness to the TPMS Data Processing Center (ECU).

The current mainstream way for WSB TPMS to monitor wheel speed is to monitor wheel speed data through an ABS wheel speed sensor (magnetoelectric) and the wheel speed data signal is transmitted through the vehicle harness to the TPMS Data Processing Center (ECU).

Indirect TPMS (e.g., wheel-speed based TPMS or WSB TPMS) can infer tire pressure from monitoring wheel speed (tire deformation) because they are related. Indirect TPMS can collect wheel speed in real time in a few hundreds of seconds after car is moving. After some corrections, this wheel speed becomes standard for (current) wheel speed, which is random and based on the assumption that the (current) tire pressure is normal. This (current) wheel speed standard is not related to cold tire pressure, and is abnormal when (current) the tire pressure is abnormal. Indirect TPMS will provide wrong tire pressure information if wheel speed standard is abnormal due to severe tire under inflation and tire over deformation caused by load increase. That is to say, the current indirect TPMS could not detect severe tire over deformation caused by load increase. One solution is to have wheel speed standard value that do not change with load and tire pressure.

In some embodiments, for example, the standard car speeds of TPMS can be measured by a vehicle navigation system (such as the GPS system, or the BeiDou Navigation Satellite System). A database of wheel speeds corresponding to standard car speeds and standard wheels could be created. The mathematical equation of car speeds and wheel speeds is: $Vg=\omega R=n2\pi R=nz\alpha R$, $Vg$ is car speed measured by GPS, $\omega$ is angular speed of wheel, n is the wheel rotation number, z is the number of teeth of wheel speed sensor, $\alpha$ is the angle (radians) between two teeth (corresponding to two electric signal), R is rotating radius of the wheels.

In some embodiments, the tire wear and real-time rotating radius of tire can be calculated from car mileage based on the relation between tire life-span and maxim tire wear. The ratio of real-time rotating radius of tire to standard rotating radius of tire can be used to correct the bias of real-time tire speed caused by wear.

In some embodiments, the method includes comparing the real-time wheel speed data after correction and compensation with the real-time standard wheel speed data, or calculating based on the mathematical relationship models of car speed/tire shape variation/tire pressure, determining that the tire pressure is abnormal and providing warnings.

A standard tire is new without wear and under cold half-loaded inflation condition or load/pressure gauge. The standard tire speeds database comprises GPS measured speeds and corresponding wheel speeds when car speeds are between zero and max limit and tire pressures are from 75% to 125% of cold tire pressures under half-loaded inflation conditions. The analytical mathematical models are mathematical relations between GPS measured speeds and corresponding wheel speeds when car speeds are between zero and max limit and tire pressures are from 75% to 125% of cold tire pressures under half-loaded inflation conditions The tire mileage can be the accumulative mileage data from the vehicle GPS and/or from the vehicle speedometer.

The embodiments disclosed herein can have one or more of the following advantageous effects:

First, the technical approaches are based on research on tire over-the-limit deformation and the resulting hidden underinflation caused by tire load changes. The reason and hazard of technical biases for passenger cars are revealed. The reasons that the presence of TPMS on a vehicle does not obviously reduce car accidents by tire failure are explained. A standard tire pressure database can be created by real-time tire load data. Standard tire pressure can be corrected by real-time tire load. This technical improvement for direct TPMS is characterized by using a dynamic tire pressure standard, that is, the tire pressure standard is cold tire pressure corresponding to current load. This technique, which can remediate the flaws of the current direct TPMS, was not studied and abandoned because of technical biases for passenger cars. This invention can also improve tire pressure monitoring and information display for current TPMS through providing drivers information like tire pressure standard, tire pressure standard boundaries and real-time tire pressure simultaneously by screen display and/or sounding allowing the driver to adjust tire pressures promptly.

Second, by using vehicle GPS recorded car speed as standard and using corresponding wheel speed standard database, or mathematical relations between car speeds and wheel speeds and mathematical relations between mileage and wear, this technique can correct and adjust tire wear caused car speed bias and wheel speed bias and provide standard wheel speed for indirect TPMS.

Tire deformation threshold or reference is an intrinsic property of tire as its range does not vary with load and tire pressure. Tire deformation range does not change any matter the tire is fully loaded or half loaded and tire pressure is high or low. Tire deformation effects rotating radius of tire which has influence on tire speed. It is an innovation of the indirect TPMS to achieve seamless tire deformation monitoring by monitoring tire speed when tire speed standard and compensation to wear caused tire speed changes are known.

As such, the "indirect" tire safety monitoring methods according to some embodiments disclosed herein do not necessarily need to monitor a tire pressure, tire load, or calculate a tire pressure baseline, even though the tire safety system may still be referred to as "TPMS." Rather, by monitoring a vehicle condition, such as the vehicle speed measured by a more accurate method, such as using the vehicle navigation system (such as GPS), and comparing the accurate vehicle speed with that measured through find the corresponding wheel speed reference and compare the difference between the real-time wheel speed and the wheel speed reference, such as a change in the wheel/tire radius, and thereby provide an indication to the driver, such as a warning that the tire is in an unsafe condition (such as in an underinflated or an overinflated state).

The indication device can be existing devices on the vehicle, such as a screen display providing a visual indication, a speaker providing an audio indication, or a heptic feedback device providing a heptic indication. The driver can obtain the tire safety information, and take actions (such as inflating the tire) to improve safety.

Various embodiments of the present disclosure introduce in-vehicle GPS vehicle speed data into the WSB TPMS'S ECU as a TPMS vehicle speed reference (reference value). Under the GPS vehicle speed reference, with a standard wheel (no wear new tire+rim) and the vehicle labeled load condition and tire cold inflation pressure, the vehicle speed/wheel speed data is recorded corresponding to the zero-to-maximum vehicle speed range of the GPS vehicle speed reference, including the wheel speed data set with tire at standard half-load inflation and 75% half-load inflation to 125% half-load inflation range (as shown in the hatching area in FIG. 2), establish the reference wheel speed database under the GPS vehicle speed reference. Or establish the mathematical expression of vehicle speed and wheel speed under the GPS vehicle speed reference: $Vg=\omega R=n2\pi R=nz\alpha R$, Vg is the GPS vehicle speed, $\omega$ is the wheel angular speed, n is the wheel revolution number, z is the wheel speed sensor tooth number, $\alpha$ is the angle between the two teeth (radian), R is the wheel rolling radius.

According to the technical principle that the tire deflection deformation reference data is a fixed value, the data acquisition of the wheel speed reference database can also be realized by the vehicle manufacturer through the bench test, the specific steps are: inflating and loading the tire of a given wheel (rim+tire) (for any tire pressure and load value within the allowable range of the tire and on load/pressure gauge), the wheel rolling radius data (fixed value data R) corresponding to the maximum effective ground contact area of the tire tread or the most uniform distribution of the positive pressure is obtained, that is, the collection of a set of data of the wheel speed reference value set of the given wheel is completed, and then according to the $V/\omega=R$ formula, the wheel speed $\omega$ corresponding to 0 to maximum vehicle speed V is calculated at a certain vehicle speed V interval (1 Km/h or 1 M1/h per interval). Then, all data pair set of the wheel speed reference value $V/\omega$ corresponding to the vehicle speed can be obtained.

Based on the condition of the maximum ground contact area of the tire, reduce the tire pressure to 75% or increase the tire pressure to 125%, and measure the corresponding wheel rolling radius, the wheel speed corresponding to the tire deflection deformation threshold and protrusion deformation threshold of the specific wheel can b e obtained. Then calculated separately at a certain vehicle speed interval, the vehicle speed/wheel speed reference value data pair corresponding to the tire deflection deformation and the convex deformation threshold value can be obtained, and all the above data pairs constitute the vehicle speed/wheel speed benchmark database.

According to the corresponding relationship between tire wear limit and tire service life, corresponding data of tire mileage and wear amount can be obtained. For example, the service life of a tire is 50,000 Km, and the thickness of the tread caused by wear is reduced by 5 mm, that is, the rolling radius of the wheel is reduced by 5 mm, and the rolling radius per 10,000 Km is calculated to be reduced by 1 mm. Therefore, the real-time wheel rolling radius can be calculated by accumulating the mileage data, and the ratio of the worn wheel rolling radius to the standard wheel rolling radius is used as a correction coefficient to compensate the wheel speed data distortion caused by the tire wear, and the real-time wheel speed is converted into the real-time standard wheel speed.

If a tire is replaced by a new one due to accidental damage of the tire during use, the rolling radius of the new tire is larger than the rolling radius of the other wheel, and the wheel speed change is opposite to the tire wear wheel speed. The TPMS data processing center can easily recognize the wheel speed change. And through the "human-machine dialogue" (alarm light+text display inquiry) way, the driver is required to confirm whether the tire is replaced (setting button), if it is confirmed that it has been replaced by new tire, the TPMS data processing center restarts calculating the cumulative mileage for the replacement tire and the tire wear. Otherwise, it is determined that the tire pressure is abnormally high.

After the GPS speed data is introduced as the WSB TPMS vehicle speed and the wheel speed reference value is established, the functions of establishing the wheel speed reference value database and correcting the real-time wheel speed distortion caused by tire wear can be realized. Since the vehicle speed/wheel speed reference value database is established, the WSB TPMS does not need to learn and calibrate the real-time wheel speed reference value, and only needs to retrieve the real-time wheel speed reference value corresponding to the real-time vehicle speed from the memory according to the real-time vehicle speed, which greatly shortens the reaction time of the TPMS system. The pre-stored calculation instruction of the non-transitory storage medium of the WSB TPMS data processor (ECU) directly compares the real-time wheel speed data with the real-time wheel speed reference value to complete the wheel speed data determination or the tire deflection deformation determination, and then issue alarm for tire pressure abnormality information. Therefore, the technical solution of the present disclosure only needs to monitor the change of the wheel speed without considering the influence of the load and the environmental factors, and only needs to compare the deviation procedure between the real-time wheel speed and the real-time wheel speed reference value to determine whether the tire deflection deformation reaches or exceeds the deformation threshold, or whether the tire pressure is compatible with the load, eliminates the drawbacks of the WSB TPMS technology.

In an aspect, a vehicle tire pressure monitoring system is provided, a computer or a processor configured to realize dynamic correlation between tire pressure baseline and tire load by at least one of: establishing a database of tire pressure baseline, wherein the database comprises data of, within the allowable load regime of tires, tire cold inflation pressure data corresponding to tire load; and determining a present tire pressure baseline by selecting, from the database, tire pressure data corresponding to real-time tire load; or establishing a mathematical relationship between tire load and inflation pressure, wherein the mathematical relationship is established based on the vehicle design parameters and tire specification data; and providing compensation and correction to tire pressure baseline data under real-time tire load based on the mathematical relationship.

In some implementations, the system further includes a plurality of sensors configured to collect data of the tire load. In some implementations, the plurality of sensors comprise at least one of: a pressure sensor, a displacement sensor, a seat sensor, an infrared sensor, or an ultrasound sensor. In some implementations, he plurality of sensors are configured to measure, directly or indirectly, real-time tire load data, and the plurality of sensors are configured to measure at least one of static tire load data or dynamic tire load data. In some implementations, the plurality of sensors are disposed at vehicle seats to measure occupancy of the vehicle to thereby indirectly measure the tire load data.

In some implementations, the plurality of sensors are disposed adjacent to or at the tires to measure directly the tire load data. In some implementations, the plurality of sensors are configured to transmit the measured data wirelessly to the processor.

In some implementations, wherein the mathematical relationship comprises: $Vg=\omega R=n2\pi R=nz\alpha R$, wherein Vg is a GPS speed, $\omega$ is a wheel angular velocity, n is a number of tire revolutions, z is a number of wheel speed sensor teeth, $\alpha$ is an angle between two teeth of the wheel speed sensor, R is a radius of the tire, wherein the processor is configured to correct the wheel speed in real time resulting from tire wearing; wherein the correction is made based on a ratio between a real-time rotating radius and a standard tire rotating radius, and wherein the real-time rotating radius Rr is calculated based on the tire wearing calculated from a tire mileage data based on a correlation between a tire lifetime and wearing limit.

In some implementations, the standard tire is a new tire or a wearing-free tire under a half load cold inflated state, the database or the mathematical relationship is based on the standard tire, between zero and a vehicle speed limit of vehicle speeds, in a range between a 75% half-load cold inflated pressure and a 125% half-load cold inflated pressure.

In some implementations, the tire mileage data are based on vehicle GPS mileage and/or vehicle odometer mileage.

In another aspect, a computer-implemented vehicle tire pressure monitoring method is provided, which can be implemented using non-transient computer-readable medium having instructions stored thereon. The method or instructions including: realizing dynamic correlation between tire pressure baseline and tire load by at least one of: establishing a database of tire pressure baseline, wherein the database comprises data of, within the allowable load regime of tires, tire cold inflation pressure data corresponding to tire load; and determining a present tire pressure baseline by selecting, from the database, tire pressure data corresponding to real-time tire load; or establishing a mathematical relationship between tire load and inflation pressure, wherein the mathematical relationship is established based on the vehicle design parameters and tire specification data; and providing compensation and correction to tire pressure baseline data under real-time tire load based on the mathematical relationship.

The first embodiment is where direct TPMS technology applied to passenger vehicles. In the specific vehicle design stage, manufacturers can get load for tires on each axis under half loaded and fully loaded working conditions or under half loaded, half full load and fully loaded working conditions from tire user manual, tire technical standard and calibrated measurements. Manufacturers can also get corresponding cold tire pressures. These data comprise TPMS dynamic tire pressure database.

Taking Audi A6 passenger car as an example, placard cold tire pressure for rear tire is 220 KPa under half load condition (3 occupants) and 290 KPa under full load condition (5 occupants). These pressures could be included in the TPMS tire pressure standard database directly as TPMS dynamic tire pressure. A linear mathematical relation between load and inflation pressure can be calculated based on the tire pressures under half load and full load conditions. The cold tire pressure under different load conditions (1, 2, 3, 4, 5 occupants) can be calculated according to this linear mathematical relation. The current tire pressure standard can be calculated from real-time load according to the analytical mathematical model of TPMS tire pressure with load as argument. Due to load stock property of tire, tire deformation could be under control when using cold tire pressures under half load and full load working conditions as standards.

Tire load (pressure) sensors are mounted on bearing parts of each wheel. These sensors can be connected to TPMS data processing center, or via data bus (e.g., CAN-BUS) communicate with TPMS data processing center, or can transmit data wirelessly to the processor.

It is possible to put forward a mathematical model that can correct and compensate cold tire pressure based on relation of tire load, deformation and tire pressure. The tire pressure standard would fit with tire load after compensation to the cold tire pressure according to real-time tire load.

By using a dynamic tire pressure standard, TPMS ECU can analyze real-time tire pressure based on current tire pressure standard and provide real-time tire pressure, current tire pressure standard, and maxima and minima value of current tire pressure standard simultaneously on screen or/and by sounding. The readout of tire pressure standard and its maxima and minima values provides driver tire pressure that is corresponding to load.

In some embodiments, tire load can be monitored indirectly by chair sensors or other sensors. Real-time tire load can be calculated from product of number of occupants and average weight of occupant. For example, Audi A6 has a gross vehicle weight of 1800 kg. If average weight of an occupant is 100 kg, then the total weight of the car will increase to 2310 kg considering 510 kg of weight increase from 5 occupants and luggage. Therefore, the real-time tire load can be roughly calculated from the number of occupants. This embodiment could satisfy real life requirement due to the "load stock" property of tire and low requirement on tire load precision.

Existing automotive car seat sensors are relatively mature technologies. For example, some vehicle models have all the seats equipped with seat sensors, and most vehicle models have at least front row seat sensors. By simply including rear seat sensors, a vehicle load indirect monitoring can be achieved. After the installation of TPMS technology product, because of working conditions do not have to change the conditions of automotive electrical bus, the Embodiment 2 of the present disclosure is particularly suitable for post installation of TPMS technology product.

In some embodiments, an indirect method of TPMS is provided, which improves upon defective existing technologies. Existing indirect TPMS wheel speed data acquisition by ABS wheel speed sensors to monitor wheel speed, and data signals are transmitted through the vehicle wiring to the TPMS data processing Center (ECU).

Allowing for access to in-car GPS device in an existing indirect TPMS, the car GPS velocity data are fed into the indirect TPMS of the embodiment of the present disclosure, as TPMS speed benchmarks. In the GPS speed benchmarks, a new or wear-free tire is used, and the vehicle load is benchmarked cold tire inflation pressure under half load conditions, recorded in the GPS speed benchmarks under the speed range from zero to maximum vehicle speed/wheel speed data (wheel speed sensor electrical signal values) corresponding values, including wheels in the standard half load and 75% to 125% half load inflated pneumatic wheel speed data collection range (shaded area shown in FIG. 2), the establishment of GPS speed benchmarks a database under the reference wheel speed, vehicle speed, or establish the reference wheel speed at the vehicle speed based on the GPS vehicle speed, or wheel speed (the number of electrical signals) of the mathematical expression: $Vg=\omega R=n2\pi R=nz\alpha R$, wherein Vg is GPS speed, $\omega$ is the angular velocity of the wheel, n for wheel revolutions, z stands for wheel speed sensor teeth, $\alpha$ stands for two teeth (corresponding to two electrical signals) between the angle (in radians), R is the radius of the wheels while rotating.

Based on correspondence between the limit by tire wear and tire life, it can be obtained the tire mileage and wear amount of the corresponding data. For example, the life of a certain type of tire is 50000 km, tire tread wear limit reduced height 5 mm, that is, the tire rotating radius is reduced by 5 mm, in terms of traveling 10,000 km per wheel rotating radius reduce 1 mm. Therefore, by the accumulated mileage car GPS data or data automobile mileage speedometer or sensor signals by the cumulative number of wheel speed, it can be calculated at any time of the wheel (tire) rotating radius. Wheel (with a worn tire) rotating radius and the standard wheel rotating radius of wheel speed ratio is real-time correction factor, distortion compensation by the wheel speed data lead to tire wear, close to the real wheel speed in reality.

If the vehicle during use due to accidental damage and replacement tires new tires, as the new tires have the rotating radius larger than the other wheels rotating radius, the wheel speed change and increased tire wear wheel speed reverse, TPMS data processing center is easy to identify the wheel speed variation, and can be realized through a "man-machine dialogue" (warning light+text display asking) mode, requiring the driver to make sure of the replacement tire (settings button). If confirmed as replacement tires already, TPMS data processing center to re-start the cumulative change tires and wheels mileage calculation tire wear; otherwise, it is determined to be caused by the tire pressure being abnormally high.

Figure 1:
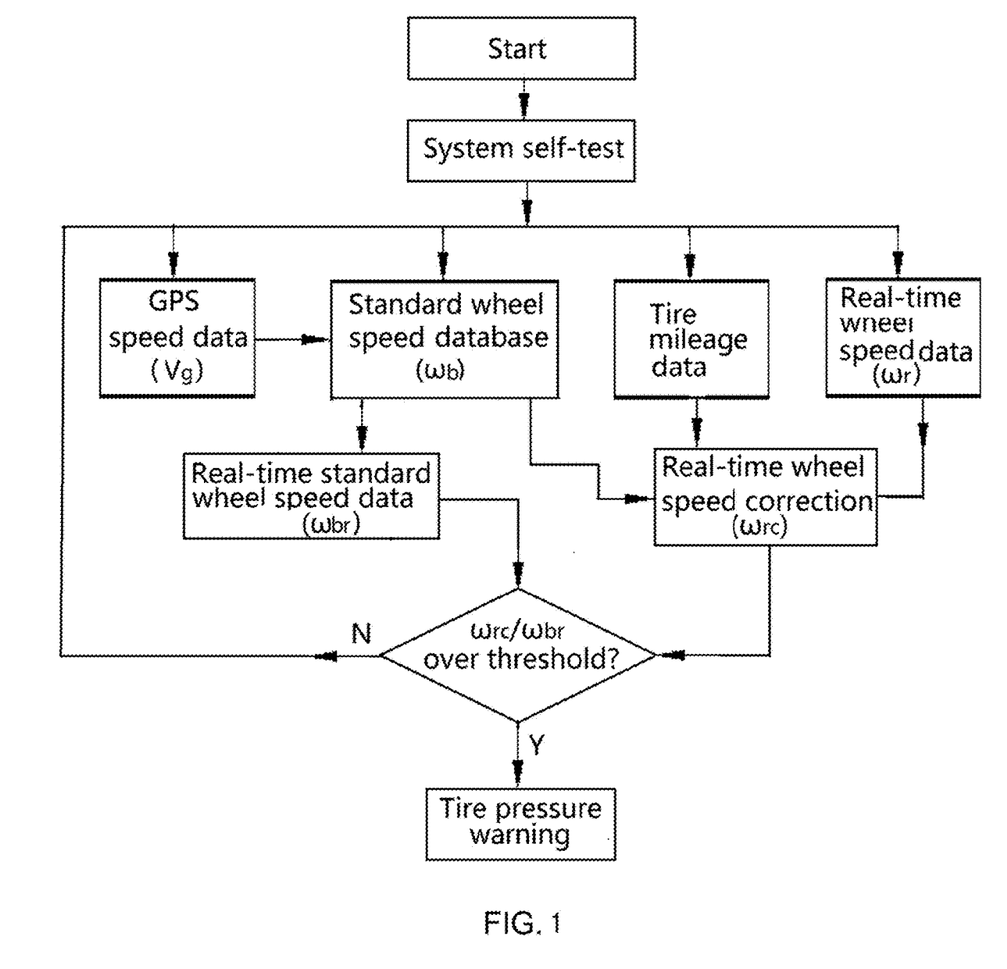
FIG. 1 is a flowchart illustrating a method improved over WSB TPMS technology according to some embodiments of the present disclosure.
Figure 2:
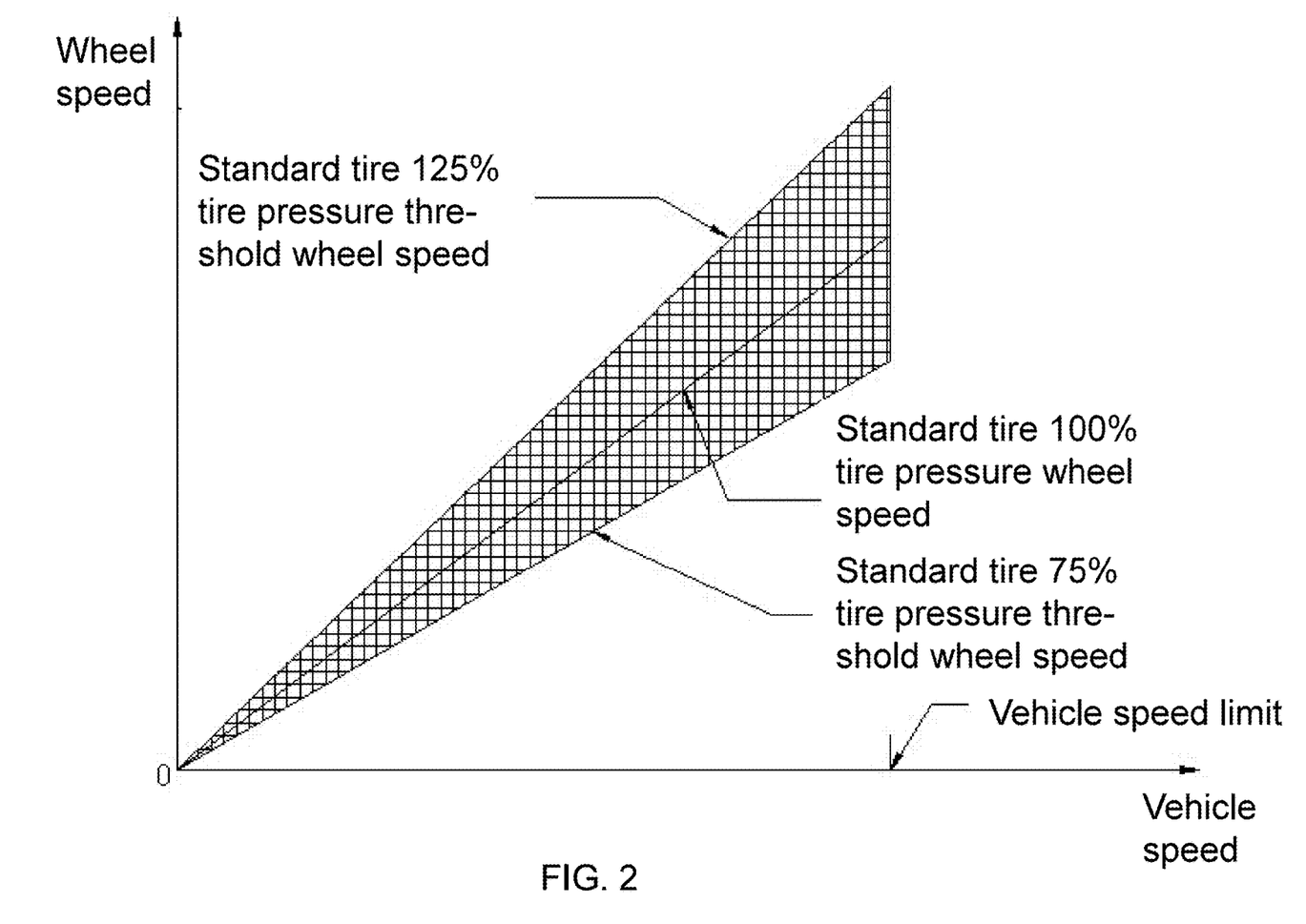
FIG. 2 illustrates a mathematical expression of wheel speed benchmark database.

After the GPS velocity data are cited for indirect TPMS wheel speed benchmarks or baseline, the two functions of establishing benchmarks and real-time correction wheel speed wheel tire wear caused by distortion can be achieved. Due to the establishment of a baseline database TPMS wheel speed, TPMS without going through the learning and memory to establish real-time wheel speed benchmarks, can be implemented to monitor the operation of the vehicle, significantly shortening the TPMS system response time; TPMS only monitor wheel speed and change, that is, when the real-time speed of the wheel speed values for the independent variables TPMS wheel speed data falling within the set range (example ranges are illustrated in FIG. 2), you can determine the tire pressure to adapt to the load and deformation is not overrun, without concern tire load, tire pressure will be able to determine whether it is normal, eliminating the existing indirect TPMS technical defects. A flowchart illustrating a method according to some embodiments of the present disclosure is illustrated in FIG. 1.

Figure 3:
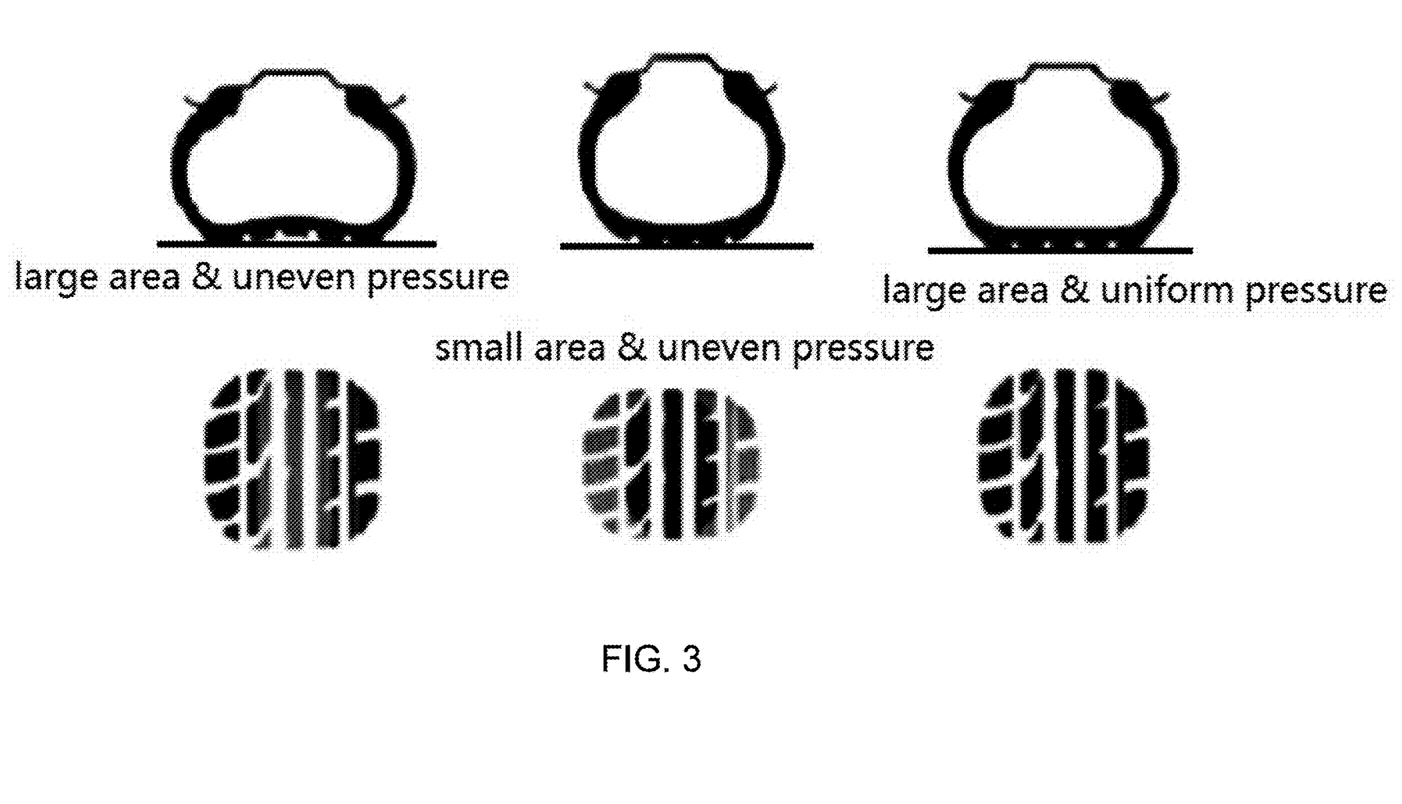
FIG. 3 is a schematic diagram illustrating effects of the ground contact areas of the tire under different working conditions.

FIG. 3 is a schematic diagram illustrating effects of the ground contact areas of the tire under different working conditions.

Wheel speed signal monitoring indirect TPMS methods can include a number of ways, such as wheel speed signal monitoring "wheel speed comparative method," "effective rotating radius method," "torsional stiffness method," "frequency method," and "tire model method," and as well as the wheel speed difference compensation, such as the BP neural network based wheel speed error compensation method, the existing wheel speed measurement accuracy reaches $2\times10^{-4}$ rad, which satisfies the WSB TPMS wheel speed monitoring accuracy requirements as well as the vehicle turns the wheel speed difference compensation process calculation methods. By introducing various embodiments of the present invention, the reference GPS speed, wheel speed reference database established and amended tire wear wheel speed distortion functions, the rest of the wheel speed monitoring methods and mathematical analysis of the relational model can invoke existing TPMS methods.

Existing WSB TPMS technologies monitor wheel speed signals in various ways, such as "wheel speed comparison method", "effective rolling radius method", "torsional stiffness method", "frequency method" and "tire model method", etc., so that the accuracy of wheel speed monitoring meet the requirements of the WSB TPMS technical solution, and is also an alternative to the wheel speed monitoring technology of the present disclosure, and the present disclosure will not be described further.

All references cited herein are incorporated by reference in their entirety. The various embodiments described herein can be implemented as a stand-alone TPMS system including a computer or a processor, or an add-on to existing systems by including a processor or computer, or a computer software, such as by implementing a non-transitory computer-readable medium having instructions stored thereon to realize the methods described herein.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation to encompass such modifications and equivalent structures.

The invention claimed is:

1. A tire safety monitoring method comprising:
obtaining a real-time wheel speed $\omega$ based on a wheel speed sensor;
establishing a standard wheel speed reference value database $\omega std$;
obtaining a real-time wheel speed reference value $\omega stdr$ corresponding to a real-time vehicle speed Vg;
comparing a real-time wheel speed corrected value $\omega c$ with $\omega stdr$ or a real-time wheel speed; and
determining a vehicle safety state based on the comparing;
wherein $\omega c$ is corrected based on a ratio between a rolling radius Rs of a worn tire and a standard wheel rolling radius R, Rs/R.

2. The method of claim 1, wherein the vehicle speed Vg is based on at least one of a GPS system or a communication system and independent of a vehicle speedometer.

3. The method of claim 1, wherein the standard wheel is a wheel of specified model and specification, including a rim and a tire, loaded and inflated according to the load/pressure gauge or the load/tire pressure (W/P) database of the vehicle, wherein the standard wheel rolling radius R=Rrim (rim radius)+H (tire sectional height).

4. The method of claim 1, wherein the standard wheel speed reference value $\omega stdr$ is obtained by: loading and inflating the standard wheel based on a load/tire pressure database or a vehicle tire pressure placard, measuring a standard wheel speed corresponding to Vg, or measuring and obtaining the standard wheel rolling radius R, or calculating $\omega stdr$ corresponding to Vg based on V/$\omega$=R, and wheel rolling radius data provided by a manufacturer of the vehicle.

5. The method of claim 1, wherein the standard wheel speed reference value $\omega std$ database is composed of $\omega std$ values having one-to-one correspondence with Vg in a range of minimum speed Vmin and a maximum speed Vmax.

6. The method of claim 1, wherein the obtaining a real-time wheel speed reference value $\omega stdr$ comprises at least one of a looking up the $\omega std$ database based on Vg, or employing a mathematical relationship between Vg and $\omega std$.

7. The method of claim 1, wherein the obtaining a real-time wheel speed reference value $\omega stdr$ comprises employing a mathematical relationship between Vg and $\omega std$.

8. The method of claim 7, wherein the mathematical relationship comprises $Vg=\omega R=n2\pi R=nz\alpha R$, where $\omega$ is an angular velocity, a wheel rolling radius R=Rrim (rim radius)+H (tire sectional height), n is a wheel revolution number, z is a number of teeth of wheel speed sensor, $\pi$ is an angle between two adjacent teeth of the wheel speed sensor.

9. The method of claim 1, wherein Rs is obtained based on a wearing of the tire based on a mileage, and a tire wearing amount h is estimated based on the mileage, and wherein R−h=Rs.

10. The method of claim 9, wherein the mileage is based on a GPS mileage or an odometer mileage.

11. The method of claim 1, wherein the $\omega std$ comprises a threshold $\omega t$ of a standard wheel, corresponding to a tire deformation threshold.

12. A tire safety monitoring method comprising:
obtaining a real-time wheel speed $\omega$ based on a wheel speed sensor;
establishing a standard wheel speed reference value database $\omega std$;
obtaining a real-time wheel speed reference value $\omega stdr$ corresponding to a real-time vehicle speed Vg;
comparing a real-time wheel speed corrected value $\omega c$ with $\omega stdr$ or a real-time wheel speed; and
determining a vehicle safety state based on the comparing;
wherein the $\omega std$ comprises a threshold $\omega t$ of a standard wheel, corresponding to a tire deformation threshold; and
wherein the tire deformation threshold comprises a 75% tire pressure corresponding to a tire deflection threshold, and a 125% tire pressure corresponding to a tire bulging threshold, based on a load/tire pressure database or a tire pressure placard.

13. A non-transitory computer-readable medium having instructions stored thereon to implement the method of claim 1.

14. The non-transitory computer-readable medium of claim 13, wherein the determining comprises a direct determining including determining a vehicle motion speed and a real time wheel speed alarm Dynamic correlation between thresholds, through at least one of database lookup or mathematical relationship.

15. The non-transitory computer-readable medium of claim 13, wherein the determining comprises an indirect determining including calculating a real-time wheel speed warning threshold based on a mathematical model, including: $Vg=\omega R=n2\pi R=nz\alpha R$, wherein Vg is a vehicle speed, $\omega$ is an angular velocity of the wheel, n is a number of revolutions of the tire, z is a number of teeth of the wheel speed sensor, $\alpha$ is the angle between the two teeth of the wheel speed sensor, and R is a radius of the tire.

16. A tire safety monitoring system comprising the non-transitory computer-readable medium of claim 13, and a processor to execute the instructions to thereby:
obtain a satellite-based vehicle speed;
derive a standard wheel speed based on the vehicle speed;
obtain a real-time actual wheel speed;
determine a tire deformation based on the standard wheel speed and the real-time actual wheel speed; and
provide an indication based on the determined tire deformation.

17. The tire safety monitoring system of claim 16, further comprising a sensor to perform the obtaining a satellite-based vehicle speed by obtaining the vehicle speed from a global positioning system (GPS).

18. The tire safety monitoring system of claim 17, wherein the deriving a standard wheel speed based on the vehicle speed comprises at least one of looking up a standard wheel reference speed database, or employing a mathematical relationship between the vehicle speed and the standard wheel speed.

19. A wheel speed alarm threshold data acquisition and database construction method, comprising:
- establishing a standard wheel speed reference value database $\omega std$; wherein the $\omega std$ comprises a threshold wt of a standard wheel, corresponding to a tire deformation threshold;
- setting a threshold value of a wheel rolling radius variation value of a rim tire based on a tire sinking deflection deformation and a convex deformation threshold value and a specified model specification; and
- collecting vehicle speed interval (Vmin-Vmax) corresponds to Vg values of $\omega x/\omega cs=75\%$ and $\omega x/\omega cs=125\%$ data, wherein $\omega x/\omega cs=75\%$ data set constitutes a tire sinking deformation alarm threshold database, $\omega x/\omega cs=125\%$ data set constitutes a database of tire bulging deformation alarm thresholds, based on a load/tire pressure database or a tire pressure placard;
- wherein $Vg=\omega R=n2\pi R=nz\alpha R$, wherein Vg is a vehicle speed, $\omega$ is an angular velocity of the wheel, n is a number of revolutions of the tire, z is a number of teeth of the wheel speed sensor, $\alpha$ is the angle between the two teeth of the wheel speed sensor, and R is a radius of the tire.

* * * * *